United States Patent
Shioya (10) Patent No.: US 6,574,046 B1
(45) Date of Patent: Jun. 3, 2003

(54) REFLECTIVE TIME-DIVISION IMAGE PROJECTOR

(75) Inventor: Yukinori Shioya, Tokyo (JP)

(73) Assignee: NEC Viewtechnology Ltd., Tokyo (JP)

( * ) Notice: Subject to any disclaimer, the term of this patent is extended or adjusted under 35 U.S.C. 154(b) by 55 days.

(21) Appl. No.: 09/667,703

(22) Filed: Sep. 22, 2000

(65) Prior Publication Data

(65)

(30) Foreign Application Priority Data

Sep. 24, 1999  (JP) .......................... 11-270613

(51) Int. Cl.$^7$ .................. G02B 27/10; G02F 1/1335
(52) U.S. Cl. .................................. 359/618; 349/9
(58) Field of Search .................. 359/627, 629, 359/618; 349/5, 6, 7, 8, 9, 10

(56) References Cited

U.S. PATENT DOCUMENTS 5,921,650 A * 7/1999 Doany et al. ................ 349/9

FOREIGN PATENT DOCUMENTS

| JP | 3-163985 | 7/1991 |
| JP | 8-21977 | 1/1996 |
| JP | 8-140106 | 5/1996 |
| JP | 8-505031 | 5/1996 |
| JP | 8-211358 | 8/1996 |
| JP | 9-127437 | 5/1997 |
| JP | 9-163391 | 6/1997 |
| JP | 11-2780 | 1/1999 |
| JP | 11-30712 | 2/1999 |

* cited by examiner

Primary Examiner—Georgia Epps
Assistant Examiner—Alicia M Harrington
(74) Attorney, Agent, or Firm—McGinn & Gibb, PLLC (57) ABSTRACT

A time-division image projector includes a light source radiating white light, a transmission color wheel, with color filters transmitting light of specific wavelength bands, a reflection element where the normal of the reflecting surface is at an inclination to light irradiated onto transmission color wheel and reflects light of specific wavelengths transmitted by color filters in a different direction, an optical modulation element supplied, in time divisions, with image signals corresponding to light of specific wavelengths reflected by reflection element and modulates, the intensity of light of the specific wavelength bands transmitted by color filters according to image signals, projection lens projecting light emitted from optical modulation element, and a motor linked to an axis of rotation of the transmission color wheel causing the transmission color wheel to rotate in synchronism with the supply of the image signals corresponding to the light of the specific wavelengths.

35 Claims, 9 Drawing Sheets

- 31G GREEN TRANSMISSION DICHROIC FILTER
- 31 TRANSMISSION COLOR WHEEL
- 31R RED TRANSMISSION DICHROIC FILTER
- 31B BLUE TRANSMISSION DICHROIC FILTER (b)

- 31a AXIS OF ROTATION
- 31 TRANSMISSION COLOR WHEEL
- 32 MOTOR
- 33 REFLECTING MIRROR
- 33a SUPPORT MEMBER

REFLECTIVE TIME-DIVISION IMAGE PROJECTOR

BACKGROUND OF THE INVENTION

1. Field of the Invention

The present invention relates to a time-division image projector, and more particularly to a time-division image projector that obtains a color projected image by rotating a color wheel, which is a color selection element in which a plurality of color filters are arranged in radiating form.

2. Description of the Related Art

The prior art includes time-division image projectors that, as a basic construction, are provided with a rotatably driven transmission color wheel in which transmission color filters that transmit each of red, green and blue light are arranged in radiating pattern. By transmitting white light that is radiated from a light source through the transmission color wheel, such an image projector isolates and projects each of the colors red, green and blue in time slots.

Japanese Patent Laid-open No. 211358/96 discloses a liquid crystal projector that uses a color filter disk. The technique disclosed in this publication is described as the first example of the prior art.

Figure 1:
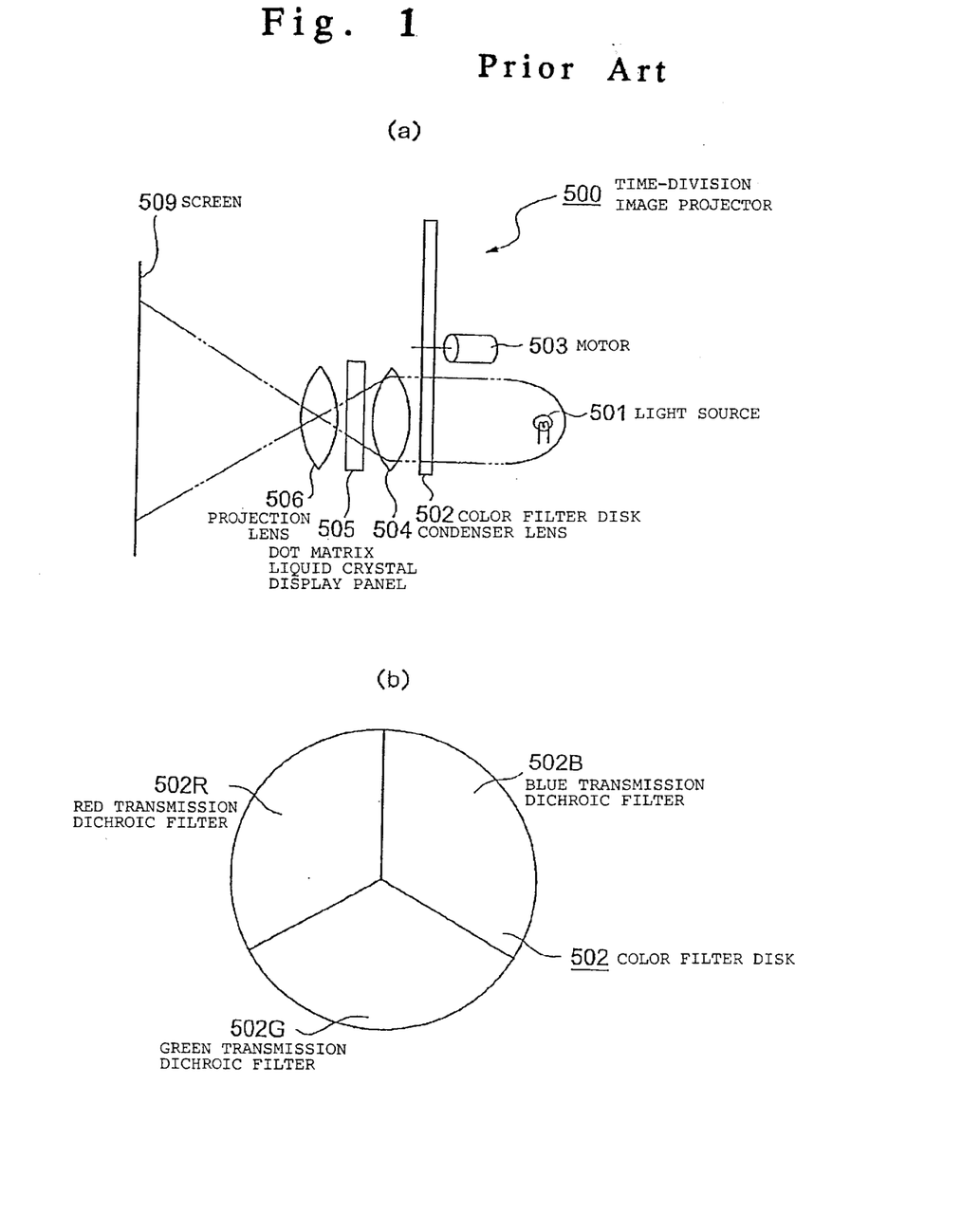
FIG. 1(a) is a side view for explaining the construction of time-division image projector 500 of the first example of the prior art.
FIG. 1(b) is an enlarged frontal view of a portion of the prior-art example.

FIG. 1(a) is a side view showing the construction of time-division image projector 500 of the first example of the prior art, and FIG. 1(b) is an enlarged frontal view of a portion of the prior-art example of FIG. 1(a).

In the time-division image projector 500 shown in FIG. 1(a), white light from white light source 501 is irradiated onto color filter disk 502 shown in FIG. 1(b), whereby red, green and blue light is transmitted in succession synchronized with the rotation of color filter disk 502. The light that is transmitted by color filter disk 502 is condensed by condenser lens 504 and irradiated onto dot matrix liquid crystal display panel 505. Dot matrix liquid crystal display panel 505, synchronized to the timing of the switching of red, green and blue colors of color filter disk 502, displays images corresponding to the red image signal, green image signal, and blue image signal. The thus-formed color image is then projected by way of projection lens 506 onto screen 509.

When this type of color filter disk 502 is used, however, the diameter of color filter disk 502 must be sufficiently greater than the outside diameter of motor 503, with the resulting problem of unwanted bulkiness of the device.

To solve this problem, a method can be considered in which, in place of the color filter disk, a reflective color wheel is used in which reflecting color filters that reflect each of red, green, and blue are arranged in radiating form.

FIG. 2(a) is a side view showing the construction of time-division image projector 600 of the second example of the prior art, and FIG. 2(b) is an enlarged frontal view of a portion of the prior-art example shown in FIG. 2(a).

In time-division image projector 600 shown in FIG. 2(a), white light from white light source 601 is irradiated onto reflective color wheel 602 shown in FIG. 2(b), and red, green, and blue light is successively reflected in synchronism with the rotation of reflective color wheel 602. The light that is reflected by reflective color wheel 602 is condensed by condenser lens 604 and irradiated onto dot matrix liquid crystal display panel 605. Dot matrix liquid crystal display panel 605 displays images corresponding to the red image signal, green image signal, and blue image signal in synchronism with the timing of the switching of red, green and blue of reflective color wheel 602. The color image that is formed in this way is projected onto screen 609 by way of projection lens 606.

A more compact time-division image projector is thus realized through the use of reflective color wheel 602, which is more compact than color filter disk 502. However, the following problems were encountered in the above-described examples of the prior art.

The first problem is a reduction in the color purity of the projected image.

Figure 3:
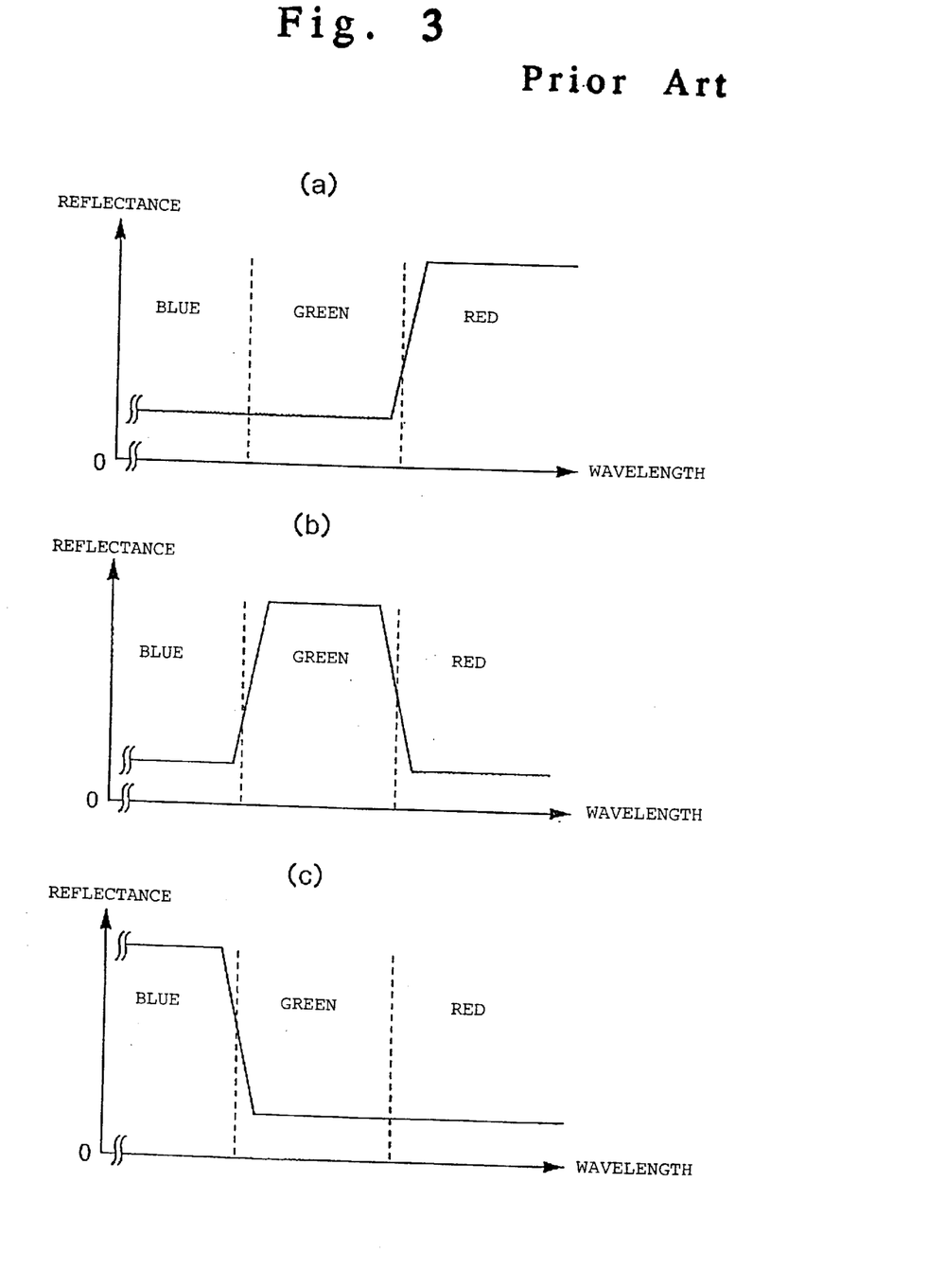
FIG. 3(a) is a chart of the reflectance-wavelength characteristic of red reflective dichroic filter 602R of the prior-art example of FIG. 2(b)
FIG. 3(b) is a chart of the reflectance-wavelength characteristic of green reflective dichroic filter 602G of the prior-art example of FIG. 2(b)
FIG. 3(c) is a chart of the reflectance-wavelength characteristic of blue reflective dichroic filter 602B of the prior-art example of FIG. 2(b).

This problem occurs because light in unwanted wavelength bands tends to be mixed in the projected image because the reflectance of unwanted wavelength bands cannot be adequately suppressed in the characteristic of reflective dichroic filters 602R, 602G, and 602B as shown in FIGS. 3(a)–(c).

A second problem is large irregularities in color in the projected image.

This problem occurs because minute discrepancies inevitably occur in the angles of mounting reflective dichroic filters 602R, 602G, and 602B, with the result that the optical axes of each of the reflected beams fail to accurately match.

Figure 2:
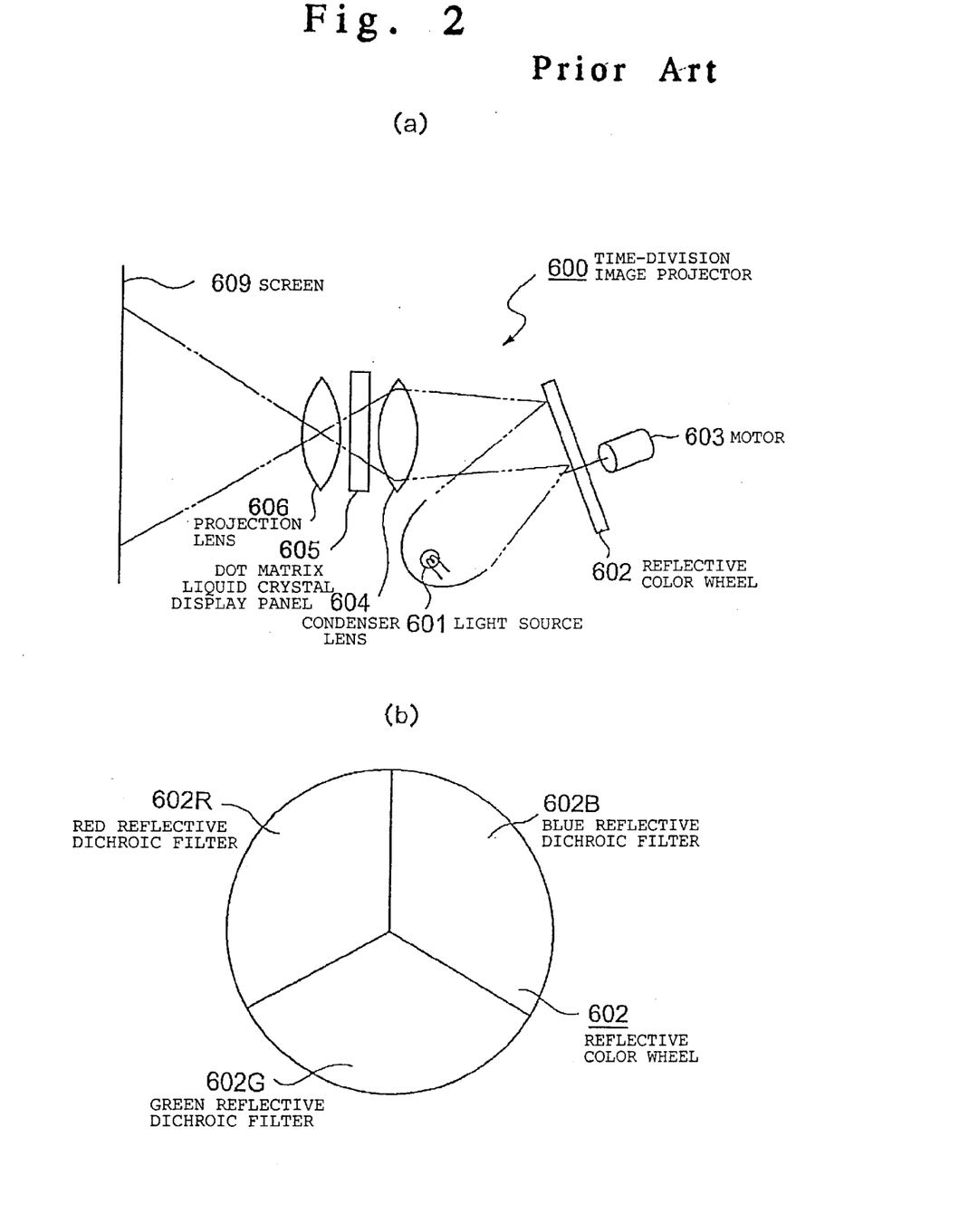
FIG. 2(a) is a side view for explaining the construction of time-division image projector 600 of the second example of the prior art.
FIG. 2(b) is an enlarged frontal view of a portion of the prior-art example.

A third problem is that, when a rod lens is added between reflective color wheel 602 and condenser lens 604 in the construction of FIG. 2 for the purpose of decreasing irregularities in color over the entire screen of a projected image, the white balance of the projected image is degraded.

This problem occurs because minute discrepancies inevitably occur in the angles in which reflective dichroic filters 602R, 602G, and 602B are mounted, which in turn causes deviations in the axes of the incident light of each of the colors to the rod lens, whereby the projected images of each color fail to accurately match.

SUMMARY OF THE INVENTION

It is an object of the present invention to provide a compact time-division image projector in which the projected image has high color purity, few irregularities in color, and a high level of white balance.

To solve the above-described problems, the present invention adopts the following novel and distinctive construction.

The time-division image projector of the present invention features the provision of: light source (1 in FIG. 4) that radiates white light; transmission color wheel (31), in which are mounted a plurality of color filters (31R, 31G, and 31B) that each transmits only light of a specific wavelength band, that selectively transmits only light of specific wavelength bands of the white light from light source (1); reflection element (33), for which the normal of the reflecting surface is arranged at an inclination with respect to light that is irradiated into transmission color wheel (31), that reflects the light of specific wavelength bands that is transmitted by color filters (31R, 31G, and 31B) in a different direction; optical modulation element (41) that is supplied, in time divisions, with a plurality of image signals corresponding to light of each of the specific wavelength bands that has been reflected by reflection element (33), and that modulates, in pixel units, the intensity of light of the specific wavelength bands that has been transmitted by color filters (31R, 31G, and 31B) according to the plurality of image signals; projection lens (5) that projects the light that is emitted from optical modulation element (41); and motor (32) that is linked with axis of rotation (31a) of transmission color wheel (31) and that causes transmission color wheel (31) to rotate in synchronism with the timing of supply of the plurality of image signals that correspond to the light of specific wavelength bands.

In other words, the chief characteristic of the present invention lies in the combined use of transmission color wheel (31) and reflection element (33) to constitute a pseudo-reflective color wheel, thereby combining the advantages of both the transmission and reflective types.

By adopting this construction, the intensity of unwanted wavelength components can be easily reduced through the use of transmission color filters (31R), (31G), and (31B), in which the attenuation rate of the unwanted wavelength bands is characteristically greater than in a reflective color filter.

In addition, the light that is irradiated onto transmission color wheel (31) is transmitted by transmission dichroic filters (31R), (31G), and (31B) and then reflected by a single reflection element (33) that is shared by each of the beams, whereby the optical axes of each of the beams can be made to accurately match. By adopting a means as described hereinabove, the time-division image projector of the present invention exhibits the following effects:

As the first advantage, the projected image has high color purity.

This high color purity results from the use of transmission dichroic filters in the color wheel, which can adequately reduce unwanted wavelength components. As the second advantage, the projected image is free of irregularities in color.

This uniformity of color is achieved not only because a single reflection element can be used in common by each color, but because the reflection element is supported independently of the color wheel or motor, thereby eliminating vibrations in the optical axes of light from the reflection element.

As the third advantage, the white balance of the projected image is not disrupted even when a rod lens is employed.

This maintenance of white balance is achieved not only because a single reflection element can be used in common for each color, but also because the reflection element is supported independently of the color wheel or motor, thereby eliminating vibrations of the optical axis of the light from the reflection element and allowing the optical axis of light irradiated into the rod lens to be kept uniform.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 4:
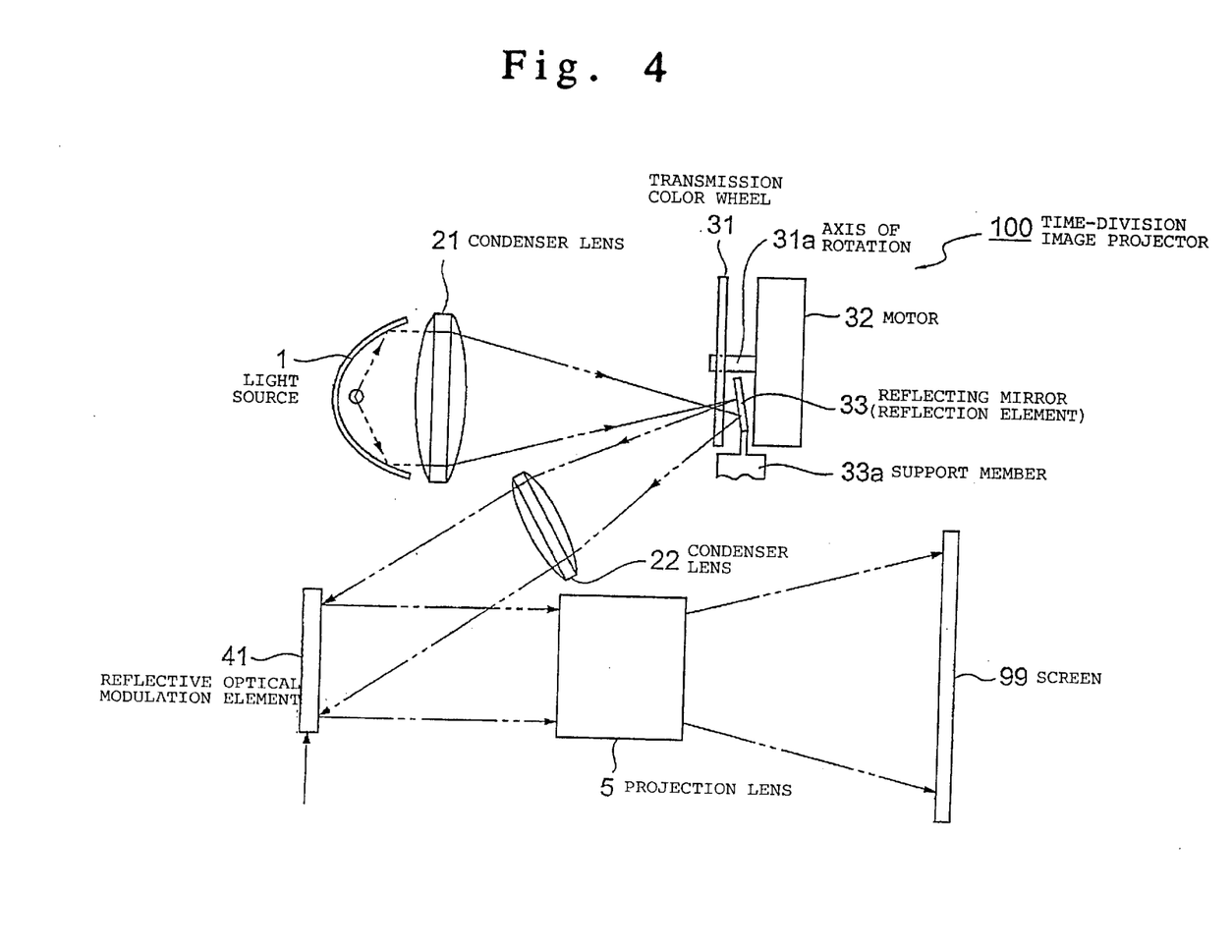
FIG. 4 is a side view for explaining the construction of time-division image projector 100 according to the first embodiment of the present invention.
Figure 5:
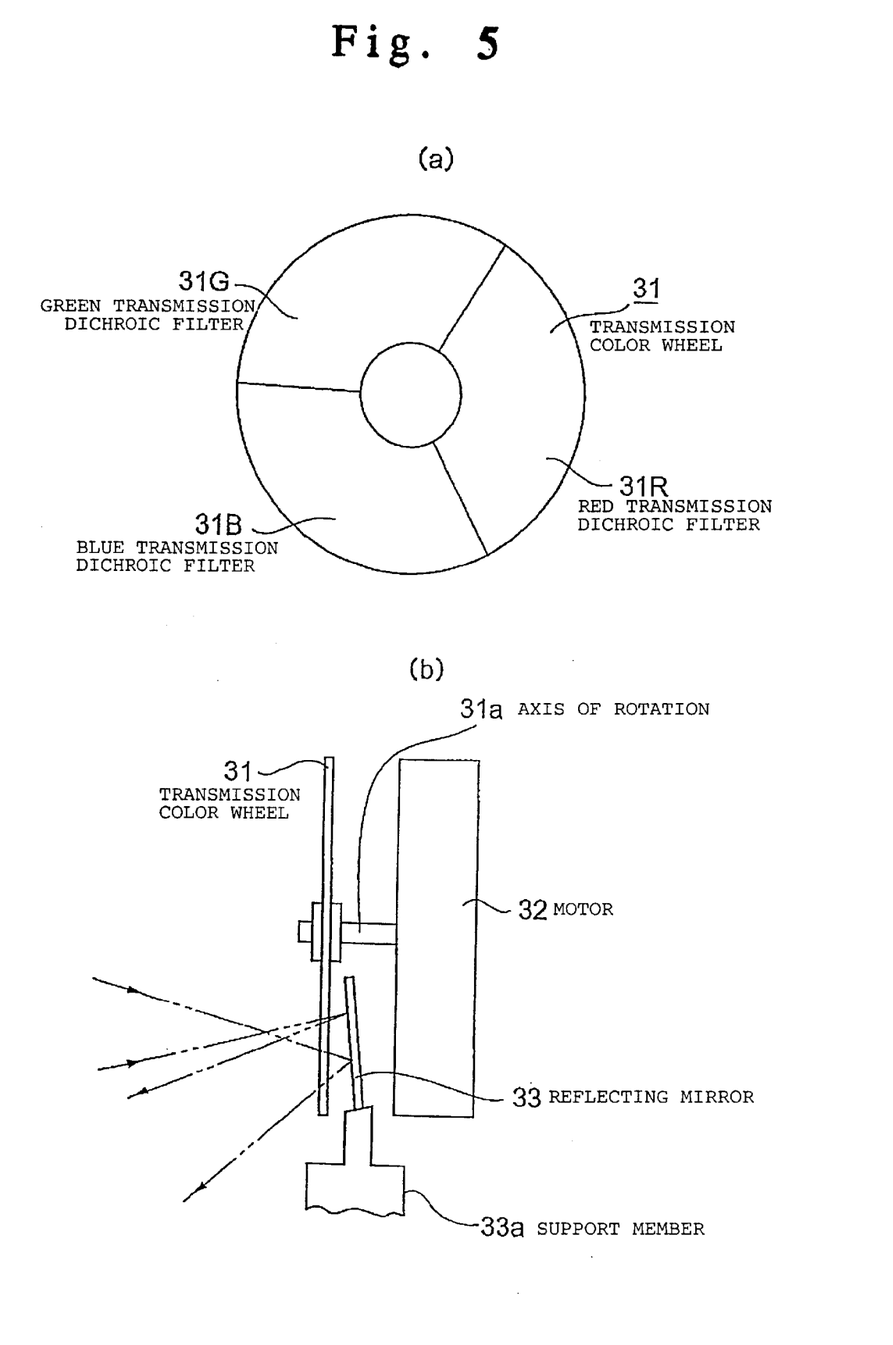
FIG. 5(a) is an enlarged frontal view of a portion of time-division image projector 100 according to the embodiment shown in FIG. 4.
FIG. 5(b) is an enlarged side view of a portion of time-division image projector 100 of the embodiment of FIG. 4.

FIG. 4 is a side view for explaining the construction of time-division image projector 100 of the first embodiment of the present invention, while FIG. 5(a) is an enlarged frontal view showing a portion of time-division image projector 100 of the embodiment of FIG. 4, and FIG. 5(b) is an enlarged side view showing a portion of time-division image projector 100 of the embodiment of FIG. 4.

Time-division image projector 100 shown in FIG. 4 is made up of: light source 1; condenser lenses 21 and 22; transmission color wheel 31; motor 32; reflecting mirror 33; reflective optical modulation element 41; and projection lens 5.

Light source 1 is a white light source, such as a metal halide lamp or halogen lamp, and radiates white light.

Condenser lens 21 causes the white light from light source 1 to converge into a beam of small diameter relative to the light when emitted from light source 1 at the surface of transmission color wheel 31 or at a position approximately at the surface.

As shown in FIGS. 5(a) and (b), transmission color wheel 31 is transmission-type color-selective optical element that is freely rotatable around the center of axis of rotation 31a and in which red transmission dichroic filter 31R, green transmission dichroic filter 31G, and blue transmission dichroic filter 31B are arranged in radiating form around axis of rotation 31a. Motor 32 is linked to this axis of rotation 31a, and transmission color wheel 31 thus rotates in synchronism with the timing of the supply of a plurality of image signals that correspond to each color that is supplied in time divisions to reflective optical modulation element 41 and successively transmits red light, green light, and blue light of the white light from light source 1.

As the method of fabricating this transmission color wheel 31, any of various method may be applied, such as directly bonding together the straight edges of each of fan-shaped dichroic filters 31R, 31G, and 31B, or inserting each dichroic filter 31R, 31G, and 31B into a frame of metal plate or plastic plate that supports the periphery of each of fan-shaped dichroic filters 31R, 31G, 31B.

Reflecting mirror 33 is arranged at an inclination with respect to transmission color wheel 31 and reflects beams that are transmitted by dichroic filters 31R, 31G, and 31B so as to cause the beams to be again transmitted by the same dichroic filters 31R, 31G, and 31B. Reflecting mirror 33 is supported by support member 33a that is independent of reflective transmission color wheel 31 and motor 32.

Condenser lens 22 is made up of one or a plurality of lenses and causes the reflected light of reflecting mirror 33 to converge and thus irradiates the light to reflective optical modulation element 41 with high efficiency.

Reflective optical modulation element 41 is a reflective optical modulation element such as a DMD (Digital Mirror Device, a trademark of Texas Instruments) that is constructed by arranging minute reflecting mirror elements corresponding to pixels in matrix form and that modulates in pixel units the intensity of reflected light of incident light by applying voltage to each of the support members of the reflecting mirror elements to twist each of the reflecting mirror elements in any direction by electromagnetic force. This reflective optical modulation element 41 is successively supplied with red image signals, green image signals, and blue image signals in time divisions, and in accordance with these image signals, modulates the intensity of reflected beams corresponding to the incident light in units of pixels arranged in matrix form.

Projection lens 5 is a lens structure in which one or a plurality of lenses are combined and enlarges and projects the reflected light of reflective optical modulation element 41 onto screen 99.

Screen 99 is arranged in front of projection lens 5 and displays the projected image.

The feature of this embodiment is that the combined use of transmission dichroic filters 31R, 31G, and 31B and reflecting mirror 33 eliminates the mixture of unwanted wavelength components with the reflected light of transmission color wheel 31.

In addition, since the light is reflected by reflecting mirror 33, variations do not occur in the optical axes as a result of relative discrepancies in angles between dichroic filters 31R, 31G, and 31B that occur when assembling transmission color wheel 31. Furthermore, since reflecting mirror 33 is supported by support member 33a that is independent of transmission color wheel 31 and motor 32, the vibration of motor 32 is not transmitted to reflecting mirror 33.

The principles of the operation of transmission color wheel 31 are next explained using red transmission dichroic filter 31R shown in FIG. 5(a).

Figure 6:
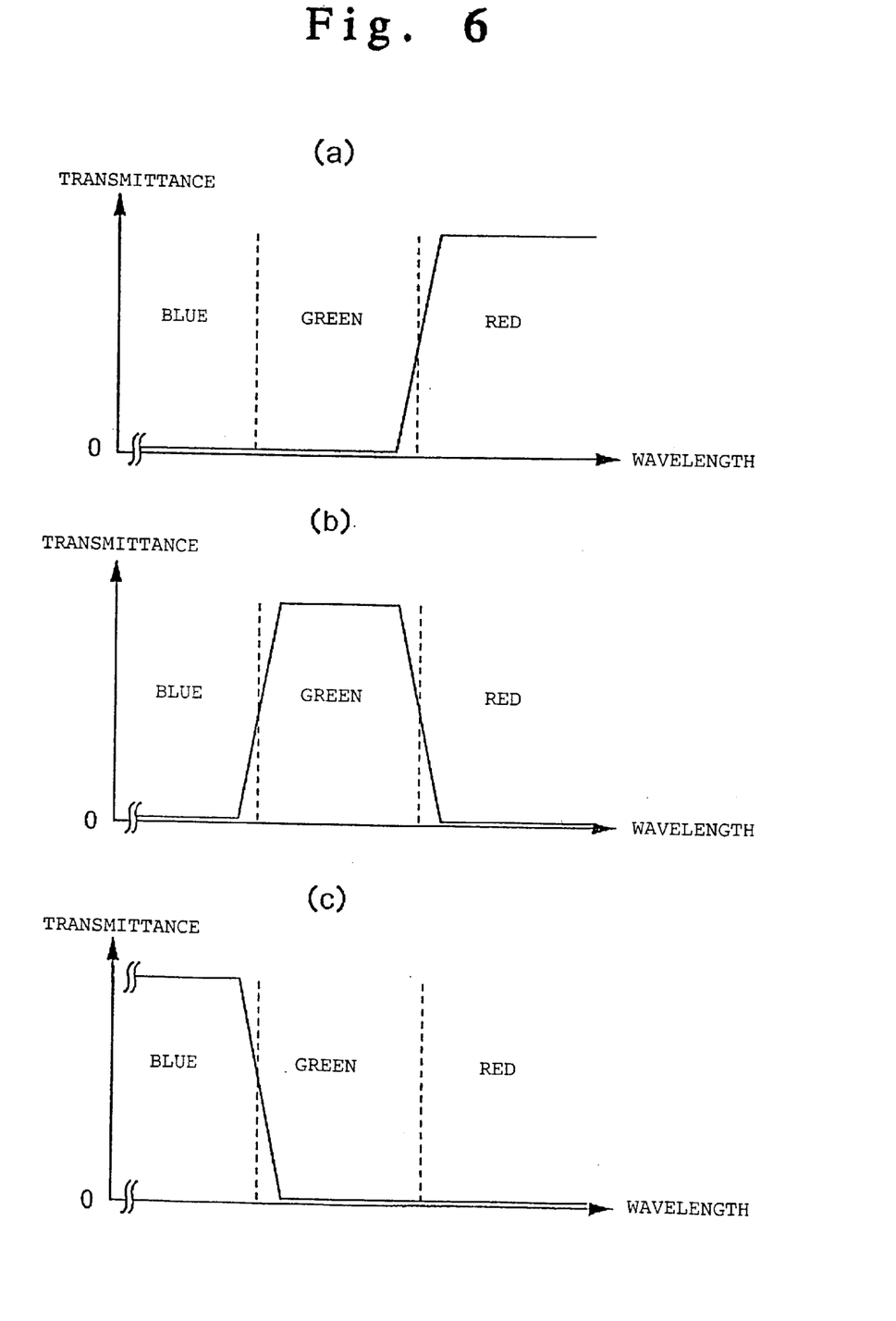
FIG. 6(a) is a chart of the transmittance-wavelength characteristic of red transmission dichroic filter 31R of the embodiment of FIG. 5(a)
FIG. 6(b) is a chart of the transmittance-wavelength characteristic of green transmission dichroic filter 31G of the embodiment of FIG. 5(a)
FIG. 6(c) is a chart of the transmittance-wavelength characteristic of blue transmission dichroic filter 31B of the embodiment of FIG. 5(a).

FIG. 6(a) is a chart of the transmittance-wavelength characteristic of red transmission dichroic filter 31R of the embodiment of the time-division image projector of FIG. 5(a), FIG. 6(b) is a chart of the transmittance-wavelength characteristic of green transmission dichroic filter 31G of the embodiment of the time-division image projector of FIG. 5(a), and FIG. 6(c) is a chart of the transmittance-wavelength characteristic of blue transmission dichroic filter 31B of the embodiment of the time-division image projector of FIG. 5(a).

As shown in FIGS. 6(a)–6(c), transmission color filters that can be easily fabricated are used as each of dichroic filters 31R, 31G, and 31B, and the transmittance of the reflected wavelength band can therefore be easily reduced. When light that is incident to transmission color wheel 31 is irradiated on red transmission dichroic filter 31R, unwanted green light and blue light are thus absorbed and only red light is transmitted, and almost no unwanted green light and blue light is included in the light that is irradiated on reflecting mirror 33.

The light that is transmitted by red transmission dichroic filter 31R is irradiated onto reflecting mirror 33 and reflected in the direction of an optical axis that differs from that of the incident light, and then again irradiated onto red transmission dichroic filter 31R. Setting the angle of incidence of the reflected light from reflecting mirror 33 to red transmission dichroic filter 31R to 20 degrees or less produces spectral characteristics that are nearly as good as for a case in which the angle of incidence is 0 degrees.

In this construction, radiated light from light source 1 proceeds toward the right in FIG. 4, passes through condenser lens 21 and transmission color wheel 31, is reflected back toward the lower left at reflecting mirror 33 to again pass through transmission color wheel 31, passes through condenser lens 22, and is irradiated onto reflective optical modulation element 41.

In reflective optical modulation element 41, reflectance is controlled in pixel units, and the light that forms the projected image is reflected toward the right to irradiate projection lens 5, which enlarges and projects the image onto screen 99.

In this embodiment, transmission dichroic filters 31R, 31G, and 31B and reflecting mirror 33 are thus used together in place of reflective dichroic filters, and as a result, the intensity of light of unwanted bands can be greatly attenuated and the optical axes of each of the colors can be accurately matched.

In addition, the use of reflecting mirror 33 that is supported independently of transmission color wheel 31 and motor 32 eliminates vibration of the optical axis of the projected image.

Figure 7:
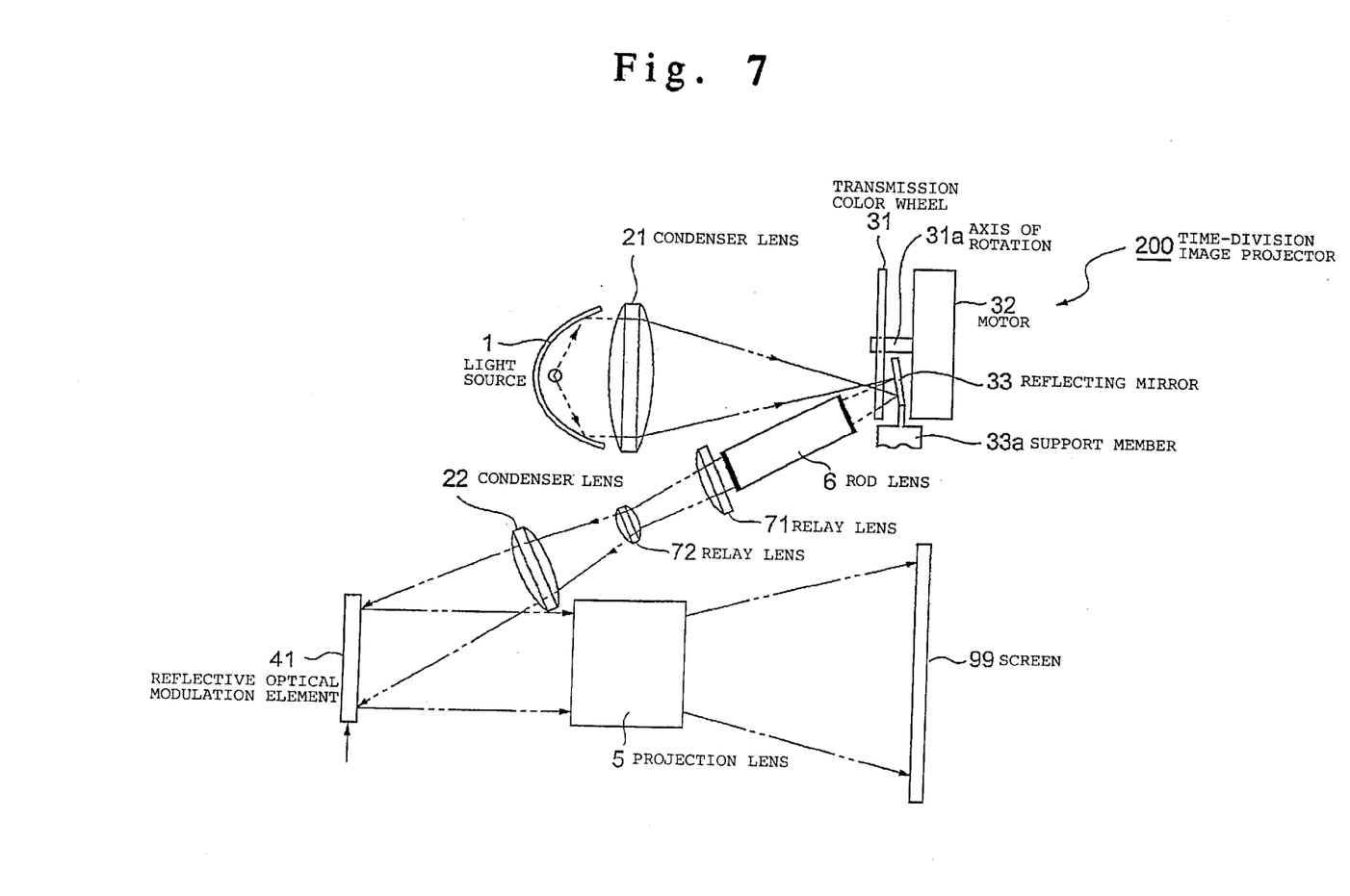
FIG. 7 is a side view for explaining the construction of time-division image projector 200 according to the second embodiment of the present invention.

FIG. 7 is a side view for explaining the construction of time-division image projector 200 according to the second embodiment of the present invention.

The chief feature of time-division image projector 200 shown in FIG. 7 is the addition of rod lens 6 and relay lenses 71 and 72 between transmission color wheel 31 and condenser lens 22 in time-division image projector 100 of the embodiment of FIG. 4.

Rod lens 6 is an optical element in which, for example, a semitransparent reflecting film is formed on both end surfaces of a cylindrical glass, or, after forming a reflecting film on both end surfaces of a cylindrical glass, a portion of this reflecting film is removed, and light is irradiated. Light that is emitted from reflecting mirror 33 can be made uniform and free of irregularities for all emitted light by causing the light to be reflected a plurality of times inside rod lens 6.

Relay lenses 71 and 72 are each made up of one lens or a combination of a plurality of lenses and serve to condense light that is emitted from rod lens 6 to prevent scattering of light and irradiate this light onto reflective optical modulation element 41.

In this construction, light radiated from light source 1 proceeds toward the right in FIG. 7; passes through condenser lens 21 and transmission color wheel 31; is reflected back toward the lower left by reflecting mirror 33 and again passes through transmission color wheel 31; passes through rod lens 6, relay lenses 71 and 72, condenser lens 22; and is irradiated onto reflective optical modulation element 41.

In reflective optical modulation element 41, reflectance is controlled in pixel units, and the light is reflected toward the right as the light that forms the projected image, irradiated into projection lens 5, and then enlarged and projected onto screen 99.

In the embodiment as described, the combined use of transmission dichroic filters 31R, 31G, and 31B and reflecting mirror 33 in place of reflective dichroic filters allows the intensity of light of unwanted bands to be greatly attenuated and causes the optical axes of each color to accurately match.

In addition, the use of reflecting mirror 33 that is supported independently of transmission color wheel 31 and motor 32 eliminates vibration of the optical axis of the projected image.

Furthermore, the use of rod lens 6 and relay lenses 71 and 72 not only makes the entire projected image more uniform and freer of irregularities than the above-described first embodiment, but also enables a reduction of light that is wasted by scattering.

In addition, since the optical axes of each of the colors that is irradiated into rod lens 6 are accurately matched, the optical axes of each color can be matched despite being repeatedly reflected a plurality of times inside rod lens 6, and the white balance of the projected image can thus be maintained at a high level.

Figure 8:
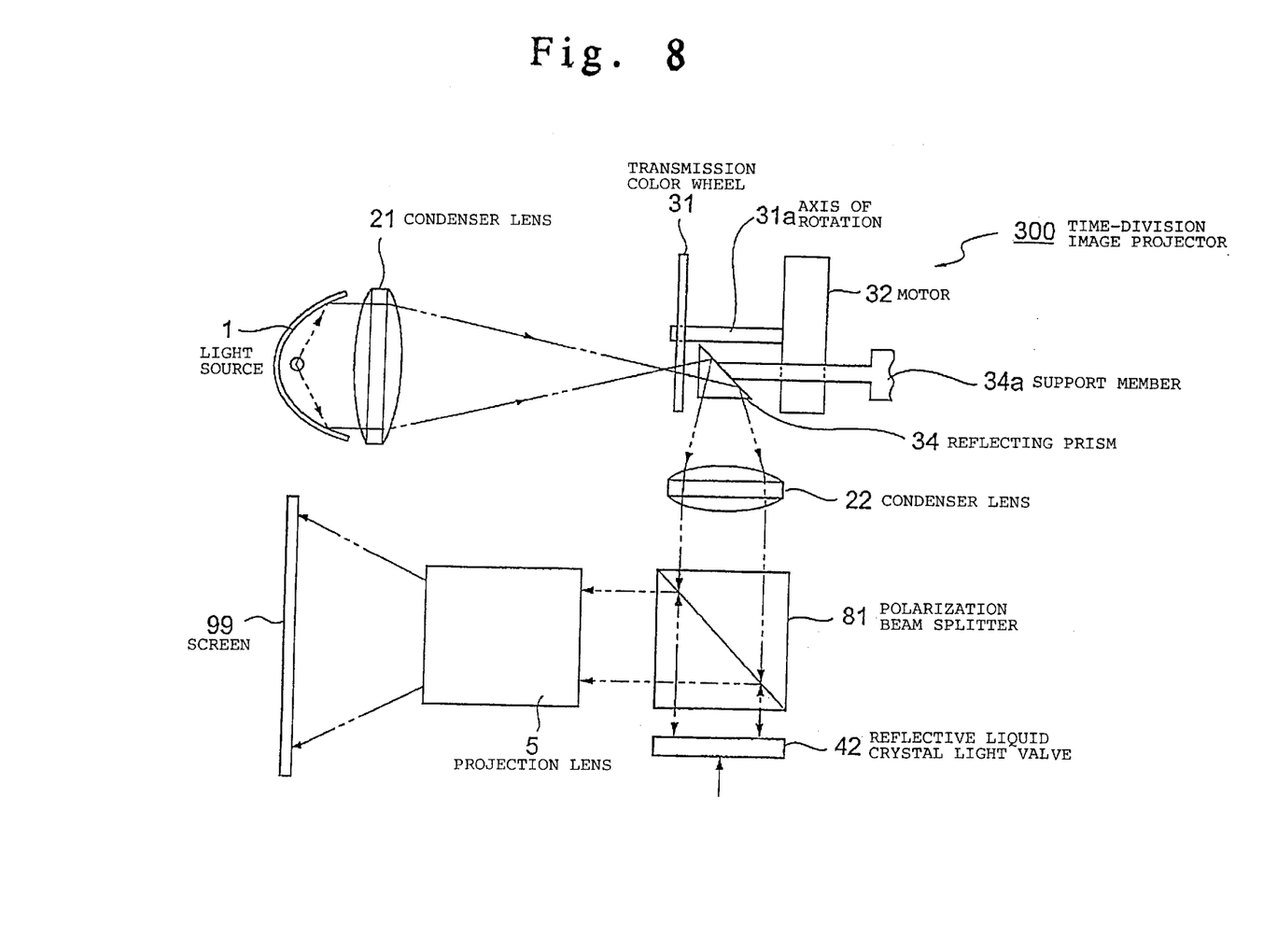
FIG. 8 is a side view for explaining the construction of time-division image projector 300 according to the third embodiment of the present invention.

FIG. 8 is a side view for explaining the construction of time-division image projector 300 of the third embodiment of the present invention.

Time-division image projector 300 shown in FIG. 8 is made up by: light source 1, condenser lenses 21 and 22, transmission color wheel 31, motor 32, reflecting prism 34, polarization beam splitter 81, reflective liquid crystal light valve 42, and projection lens 5. White light that is emitted from light source 1 and caused to converge by condenser lens 21 is then irradiated into transmission color wheel 31 as a beam of small diameter.

Transmission color wheel 31 has the same construction as the embodiment of FIG. 4, and by rotating transmission color wheel 31 in synchronism with the scanning of image signals that are supplied to reflective liquid crystal light valve 42, only the light of each primary color of the white light from light source 1 is successively transmitted in time divisions.

Reflecting prism 34 is an optical prism and is arranged with a reflecting surface at an inclination with respect to transmission color wheel 31 and reflects light that has been transmitted by dichroic filters 31R, 31G, and 31B without again directing the light toward color wheel 31. In this case, reflecting prism 34 is supported by support member 34a that is independent of transmission color wheel 31 and motor 32.

Condenser lens 22 has the same construction as in the embodiment of FIG. 4 and causes the reflected light of reflecting prism 34 to converge and irradiates the light toward reflective liquid crystal light valve 42 with high efficiency.

Polarization beam splitter 81 is an optical element that splits the reflected light and irradiated light of reflective liquid crystal light valve 42 using the difference in transmittance and reflectance due to phase difference, and transmits the irradiated light of reflective liquid crystal light valve 42 but reflects the reflected light.

Reflective liquid crystal light valve 42 is an optical modulation element composed of a large number of minute liquid crystal pixels arranged in a matrix and selectively transmits or blocks irradiated light in pixel units according to supplied image signals. Reflective liquid crystal light valve 42 is successively supplied with red image signals, green image signals, and blue image signals and modulates the intensity of reflected light in pixel units according to these supplied image signals. The direction of polarization of this reflected light is rotated 90 degrees from the direction of polarization of irradiated light.

Projection lens 5 has the same construction as in the embodiment of FIG. 4 and enlarges and projects the reflected light of reflective liquid crystal light valve 42 onto screen 99.

In this construction, light that is emitted from light source 1 proceeds toward the right in FIG. 8; passes through condenser lens 21 and transmission color wheel 31; is reflected downward by reflecting prism 34 and irradiated into condenser lens 22 without again passing through transmission color wheel 31; passes through polarization beam splitter 81 and proceeds straight to be irradiated into reflective liquid crystal light valve 42.

In reflective liquid crystal light valve 42, reflectance is controlled in pixel units and the light is reflected upward as the light that forms the projected image, is again irradiated into polarization beam splitter 81 to be reflected toward the left, and enters projection lens 5 to be enlarged and projected onto screen 99.

In the embodiment as described, the combined use of transmission dichroic filters 31R, 31G, and 31B and reflecting prism 34 in place of reflective dichroic filters enables the intensity of light of unwanted bands to be greatly attenuated and causes the optical axes of each color to accurately match.

In addition, the use of reflecting prism 34 that is supported independently of transmission color wheel 31 and motor 32 eliminates vibration of the optical axis of the projected image.

Figure 9:
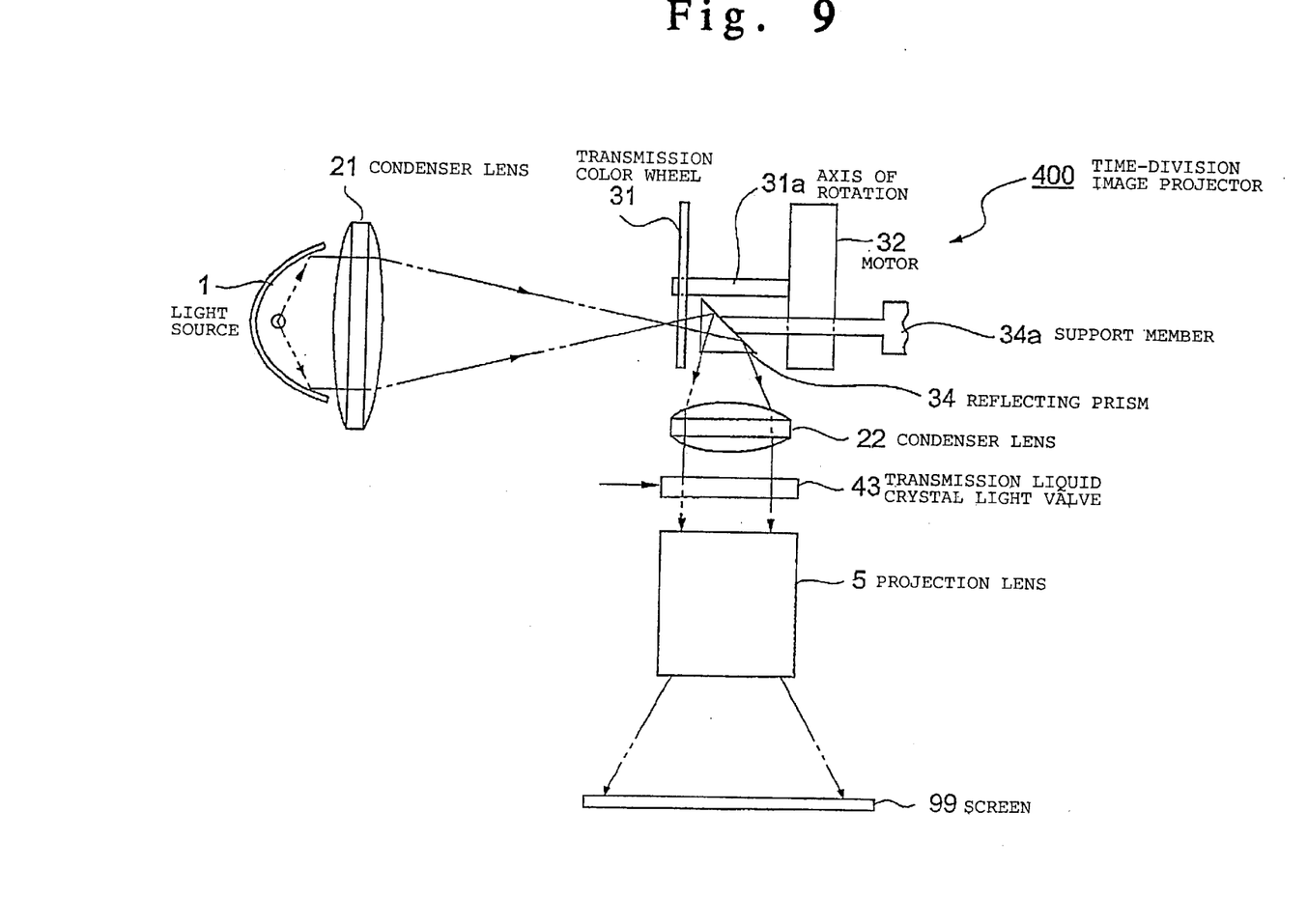
FIG. 9 is a side view for explaining the construction of the time-division image projector 400 according to the fourth embodiment of the present invention.

FIG. 9 is a side view for explaining the construction of time-division image projector 400 of the fourth embodiment of the present invention.

Time-division image projector 400 shown in FIG. 9 is composed of: light source 1; condenser lenses 21 and 22; transmission color wheel 31; motor 32; reflecting prism 34, transmission liquid crystal light valve 43, and projection lens 5.

White light that is emitted from light source 1 and caused to converge at condenser lens 21 is irradiated as a beam of small diameter toward transmission color wheel 31.

Transmission color wheel 31 has the same construction as in the embodiment of FIG. 4 and successively transmits in time divisions only the light of each primary color of the white light from light source 1.

Reflecting prism 34 has the same construction as in the embodiment of FIG. 8 and reflects light that is passed through transmission color wheel 31 in the direction of a different optical axis without again irradiating the light into color wheel 31.

Condenser lens 22 has the same construction as in the embodiment of FIG. 4 and causes the reflected light from reflecting prism 34 to converge and irradiates the light into transmission liquid crystal light valve 43 with high efficiency.

Transmission liquid crystal light valve 43 is an optical element in which a large number of minute liquid crystal pixels are arranged in matrix form and modulates the intensity of transmitted light for irradiated light in pixel units by selectively transmitting or blocking the irradiated light in pixel units. Transmission liquid crystal light valve 43 is successively supplied with red image signals, green image signals, and blue image signals in time divisions, and according to each of these image signals, modulates the intensity of transmitted light in pixel units.

Projection lens 5 has the same construction as in the embodiment of FIG. 4 and enlarges and projects the transmitted light from transmission liquid crystal light valve 43 onto screen 99.

In this embodiment, light that is emitted from light source 1 proceeds toward the right in FIG. 9; passes through condenser lens 21 and transmission color wheel 31; is reflected downward by reflecting prism 34 and is irradiated into condenser lens 22 without again passing through transmission color wheel 31; and is irradiated into transmission liquid crystal light valve 43.

In transmission liquid crystal light valve 43, transmittance is controlled in pixel units and light is transmitted as the light that forms the projected image, whereupon the light is irradiated into projection lens 5 and enlarged and projected onto screen 99.

In the embodiment as described, the combined use of transmission dichroic filters 31R, 31G, and 31B and reflecting prism 34 in place of reflective dichroic filters both enables the intensity of light of unwanted bands to be greatly attenuated and causes the optical axis of each color to accurately match.

In addition, the use of reflecting prism 34 that is supported independently of transmission color wheel 31 and motor 32 eliminates vibration of the optical axis of the projected image.

In each of the above-described embodiments, the angle of incidence of irradiated light to transmission color wheel 31 was set to 0 degrees, but any angle may be set.

In addition, although reflecting mirror 33 was used as the reflection element in the first and second embodiments, reflecting prism 34 may be used instead.

Finally, although reflecting prism 34 was used as the reflection element in the third and fourth embodiments, reflecting mirror 33 may be used instead.

While preferred embodiments of the present invention have been described using specific terms, such description is for illustrative purposes only, and it is to be understood that changes and variations may be made without departing from the spirit or scope of the following claims.

What is claimed is:

1. A time-division image projector, comprising:
   a light source that radiates white light;
   a transmission color wheel, in which are mounted a plurality of transmission color filters that each transmit only light of specific wavelength bands, and that selectively transmit only light of said specific wavelength bands of said white light from said light source;
   a reflection element formed at a predetermined angle, for which the normal of the reflecting surface is arranged at an inclination with respect to light that is irradiated into said transmission color wheel, and that reflects light of said specific wavelength bands that is transmitted by said transmission color filters in a different direction;
   an optical modulation element that is supplied, in time divisions, with a plurality of image signals that each correspond to light of a respective one of said specific wavelength bands that has been reflected by said reflection element and that modulates, in pixel units, the intensity of light of said specific wavelength bands according to said plurality of image signals;
   a projection lens that projects the light that is emitted from said optical modulation element;
   a motor that is linked with an axis of rotation of said transmission color wheel and that causes said transmission color wheel to rotate in synchronism with image signals;
   a projection lens that projects the light that is emitted from said reflective optical modulation element; and
   a motor that is linked with the axis of rotation of said transmission color wheel and that causes said transmission color wheel to rotate in synchronism with the timing of supply of said plurality of image signals that correspond to light of said specific wavelength bands.

2. A time-division image projector according to claim 1 wherein said optical modulation element is a digital mirror device constructed by arranging a multiplicity of light reflection elements.

3. A time-division image projector according to claim 1 wherein said plurality of color filters are dichroic filters having wavelength selectivity.

4. A time-division image projector according to claim 1 wherein said reflection element is an optical mirror.

5. A time-division image projector according to claim 1 wherein said reflection element is an optical prism.

6. A time-division image projector according to claim 1 wherein said reflection element is supported independently of said color wheel and said motor.

7. A time-division image projector according to claim 1, further comprising a first condenser lens immediately following said light source for causing light that is emitted from said light source to converge at the surface of said transmission color wheel.

8. A time-division image projector according to claim 1, further comprising a second condenser lens immediately following said reflection element for focusing light that is reflected by said reflection element.

9. A time-division image projector according to claim 1, further comprising a rod lens between said reflection element and said optical modulation element for making distribution of light that is emitted from said reflection element uniform and irradiating this light to said optical modulation element.

10. A time-division image projector according to claim 1, further comprising a relay lens between said reflection element and said optical modulation element for focusing light that is emitted from said reflection element and irradiating the light on said optical modulation element.

11. The time-division image projector according to claim 1, wherein said reflection element is non-selective with regard to reflecting said specific wavelength bands.

12. The time-division image projector according to claim 1, wherein said plurality of color filters are radially arranged on said transmission color wheel.

13. The time-division image projector according to claim 1, wherein said irradiated light is reflected by a single reflection element.

14. The time-division image projector according to claim 1, wherein said plurality of color filters are transmission dichroic filters producing high color purity by adequately reducing unwanted wavelength components.

15. The time-division image projector according to claim 1, wherein said reflection element is a single reflection element used in common by each color to produce uniformity of color.

16. The time-division image projector according to claim 1, wherein said reflection element is supported independently of said transmission color wheel and said motor.

17. The time-division image projector according to claim 1, wherein said reflection element is a single reflection element used in common by each color to maintain white balance of a projected image.

18. The time-division image projector according to claim 1, wherein said light has an optical axis uniformly irradiated into a rod lens.

19. A time-division image projector, comprising:

a light source that radiates white light;

a transmission color wheel, in which are mounted a plurality of transmission color filters that each transmit only light of specific wavelength bands, and that selectively transmit only light of said specific wavelength bands of said white light from said light source;

a reflection element formed at a predetermined angle, for which the normal of the reflecting surface is arranged at an inclination with respect to light that is irradiated into said transmission color wheel, and that reflects light of said specific wavelength bands that is transmitted by said transmission color filters in a direction that is both different and that causes said light to again pass through said transmission color filters;

a reflective optical modulation element that is supplied, in time divisions, with a plurality of image signals that each correspond to light of a respective one of said specific wavelength bands that has been reflected by said reflection element and that modulates, in pixel units, the intensity of reflection of light of said specific wavelength bands according to said plurality of image signals;

a projection lens that projects the light that is emitted from said reflective optical modulation element; and a motor that is linked with an axis of rotation of said transmission color wheel and that causes said transmission color wheel to rotate in synchronism with the timing of supply of said plurality of image signals that correspond to light of said specific wavelength bands.

20. A time-division image projector according to claim 19 wherein said reflective optical modulation element is a digital mirror device constructed by arranging a multiplicity of light reflection elements.

21. A time-division image projector according to claim 1 wherein said plurality of color filters are dichroic filters having wavelength selectivity.

22. A time-division image projector according to claim 19 wherein said reflection element is an optical mirror.

23. A time-division image projector according to claim 19 wherein said reflection element is supported independently of said color wheel and said motor.

24. A time-division image projector according to claim 19, further comprising a first condenser lens immediately following said light source for causing light that is emitted from said light source to converge at the surface of said transmission color wheel.

25. A time-division image projector according to claim 19, further comprising a second condenser lens immediately following said reflection element for focusing light that is reflected by said reflection element.

26. A time-division image projector according to claim 19, further comprising a rod lens between said reflection element and said optical modulation element for making distribution of light that is emitted from said reflection element uniform and irradiating this light to said optical modulation element.

27. A time-division image projector according to claim 19, further comprising a relay lens between said reflection element and said optical modulation element for focusing light that is emitted from said reflection element and irradiating the light on said optical modulation element.

28. The time-division image projector according to claim 19, wherein said reflection element is non-selective with regard to reflecting said specific wavelength bands.

29. The time-division image projector according to claim 19, wherein said plurality of color filters are radially arranged on said transmission color wheel.

30. The time-division image projector according to claim 19, wherein said irradiated light is reflected by a single reflection element.

31. The time-division image projector according to claim 19, wherein said plurality of color filters are transmission dichroic filters producing high color purity by adequately reducing unwanted wavelength components.

32. The time-division image projector according to claim 19, wherein said reflection element is a single reflection element used in common by each color to produce uniformity of color.

33. The time-division image projector according to claim 19, wherein said reflection element is supported independently of said transmission color wheel and said motor.

34. The time-division image projector according to claim 19, wherein said reflection element is a single reflection element used in common by each color to maintain white balance of a projected image.

35. The time-division image projector according to claim 19, wherein said light has an optical axis uniformly irradiated into a rod lens.

* * * * *